March 4, 1969 H. FLEISSNER ET AL 3,430,356
SIEVE DRUM GAS-SOLID CONTACT APPARATUS
Filed Dec. 20, 1965 Sheet 1 of 3

Inventor:
HEINZ FLEISSNER
GEROLD FLEISSNER
BY Dicke + Craig
ATTORNEYS

Inventor:
HEINZ FLEISSNER
GEROLD FLEISSNER
BY Dicke + Craig
ATTORNEYS

United States Patent Office 3,430,356
Patented Mar. 4, 1969

3,430,356
SIEVE DRUM GAS-SOLID CONTACT APPARATUS
Heinz Fleissner and Gerold Fleissner, Egelsbach, near Frankfurt am Main, Germany, assignors to Anstalt fur Patentdienst, Vaduz, Liechtenstein
Filed Dec. 20, 1965, Ser. No. 515,000
Claims priority, application Germany, Dec. 21, 1964,
A 47,945
U.S. Cl. 34—132
Int. Cl. F26b *11/04*
28 Claims

ABSTRACT OF THE DISCLOSURE

A device for the treatment of all kinds of materials, especially for the drying, cooling, or steaming of materials in a non-woven condition, which may conveniently be supported only on one side thereof, comprising at least one relatively large sieve drum conveyor, each of the sieve drums having several fans distributed, at least opposite one lateral side of the drum, in the direction of travel of the material and near the periphery of the drum, to create a partial vacuum to retain the material being treated upon the sieve drum conveyor. In accordance with one embodiment of the present invention, the fans are concentrated at those portions of the circumference of the sieve drum at which the material being conveyed is traveling in a substantially vertical direction.

---

The present invention relates to a device for the treatment, especially for drying, cooling, or steaming, of all kinds of materials, especially of fleece-forming materials, such as non-wovens, which may not be reversed during the treatment process and/or which may only be supported on one side; the device of the present invention is provided with at least one sieve drum as conveying means for the material and the material to be dried is held onto the sieve drum jacket by a partial vacuum within the sieve drum and is transported through the treatment chamber by the sieve drum, the partial vacuum in the sieve drum being created by fans which are preferably mounted to the side or the sides of the sieve drum.

Devices for the treatment of all kinds of materials with sieve drums subjected to a suction draft as conveying means are generally known in the prior art. In the known devices a fan wheel is arranged at one or at both sides of the sieve drum. Devices with the fans arranged inside the sieve drum or outside at a certain distance from the sieve drum jacket are also known. In the case of the known devices, usually sieve drums up to a diameter of about 2 meters are used. If sieve drums with a larger diameter are used, also the fan wheels must be enlarged correspondingly in order to provide for the required capacity for holding the material to the sieve drum jacket. In the known sieve drum dryers the lateral fan wheels have, in general, a diameter which is only slightly smaller than the drum diameter. The balancing problems and the demands made of the bearings increase considerably with an increasing fan wheel diameter. It is, above all, because of these problems that manufacturers hesitate to enlarge the drum diameter beyond 2 meters.

Since the conveying path of such a drum as is available today does, in general, not suffice for drying, steaming, or other treatments of the material, a treatment device usually contains several drums. In general, the material to be treated is carried along the upper portion of one drum and then along the lower portion of the following drum, onto which it is held by the suction draft. This means that at first one side of the material lies on the drum whereas on the following drum the other side of the material is held onto the drum jacket. In many cases this is particularly advantageous because perfect drying or other treatment is achieved if the two faces of the material are alternately circulated and penetrated by the treatment medium.

However, also devices with sieve drums are known in which the material is only carried on the upper portion of the sieve drums. Since in that case the conveying path is substantially shorter, the number of drums must be considerably increased. However, this causes such a device to be much more expensive. Devices with sieve drums in which the material to be treated passes only along the upper portions of the sieve drums are, above all, used if only one side of the material should adhere to the sieve drum during the treatment process, e.g., in the case of nonwovens or lengths of fabric coated with a liquid or viscous substance, and the like.

The advantages offered by the treatment devices with sieve drums subjected to a suction draft as compared with devices provided with other conveying means, especially conveyor belts, are generally known. The advantages are, among others: particular economy, better treatment effect, and a sturdy, uncomplicated and space-saving construction.

The present invention has the task to extend the applicability of the known treatment devices with sieve drums subjected to a suction draft and to improve those devices in such a way that they are well suited for the treatment of materials which may not be reversed during the treatment process and/or which may only be supported on one side during the treatment.

In accordance with the present invention, this task is solved in a surprisingly simple way by providing preferably an extremely large sieve drum, for instance, with a diameter of more than 3 meters, for holding and carrying the material through the drying chamber and by providing several fans at and/or near the circumference of the drum jacket. The object of the present invention to arrange several fans at the circumference of the sieve drum makes it possible to provide a sieve drum of any desired size.

In another embodiment of the present invention, it is suggested to arrange the fans laterally of the sieve drum in a common fan chamber which is separated from the treatment chamber by means of a partition wall. At the exhaust connections of the fans, openings are provided in the partition wall, the size of which openings corresponds to that of the exhaust connections.

If the fans are arranged laterally in a separate chamber, it offers the advantage that the fans and the heating devices which are also accommodated in the fan chamber are considerably more accessible, especially if, according to another object of the present invention, each fan with its drive is designed as a drive-out or pull-out unit. It is of advantage to support the fan together with its drive movable on rails outside the housing of the device and to provide the housing of the device with openings for driving or moving in and out the fans, which openings can be closed by movable walls or doors that are arranged behind the fans and which belong to the fan drive unit. If the fan drive unit is driven or pulled-out of the housing, it is easily accessible from all sides for maintenance and repair work. At the same time, the heating devices in the fan chambers are easily accessible if the fans are driven or moved out so that the heating tubes can be cleaned easily and quickly.

The fact that, according to the present invention, the heating devices are essentially accommodated in the fan chamber, offers the further advantage that no further parts in the treatment chamber, in which the sieve drum is accommodated, hinder access to the sieve drum so that repair of the sieve drum or the sieve drum bearing or the sieve drum drive is substantially facilitated.

According to another object of the present invention, the sieve drum jacket is composed of several perforated sheets and connected with the two bearing hubs by adjustable spokes. By means of the spokes, the length of which is preferably adjustable, tensioning and re-adjustment of the drum jacket is possible at any time. In the case of extremely large sieev drums, smaller bearing deviations affect the bearings of the sieve drum in the treatment chamber significantly.

According to another object of the present invention, re-adjustment of the sieve drum is easily possible by supporting the sieve drum and/or the sieve drum shaft on adjustable stays. The stays can be adjusted by varying their length or by adjustable stay bearings on the bottom.

In the case of extremely large sieve drums, it is no longer of advantage to arrange the drive at the shafts of the sieve drums and to drive the sieve drum by way of the shafts as in the case of standard-size sieve drums. It is much more favorable if, according to the present invention, the sieve drums are driven at the drum jacket by means of friction wheels or by a gear wheel which engages in a gear rim mounted to the drum jacket.

The device according to the present invention is further simplified if a common conveyor belt is provided for feeding and discharging the material. In another embodiment of the present invention, it is suggested to support the common conveyor belt movable so that it can be driven or moved out of the housing of the device. On the one hand, this facilitates maintenance and, on the other hand, repair of the conveyor belt and of the sieve drum can be done quicker because with a driven-out or removed conveyor belt all parts are more readily accessible.

It has been found that in a device according to the present invention the same treatment effect can be achieved with a lower fan capacity if, according to another object of the present invention, the fans are preferably arranged at those portions of the sieve drum which carry the material essentially vertically. In this way, the most powerful suction draft prevails at those portions because most energy is required thereat for holding the material to be treated.

According to another object of the present invention, the sieve drum and the conveyor belt and/or the respective drives are designed in such a way that the direction of material passage can be reversed. Thus, one standard construction suffices because the material to be treated can be fed and discharged from the left-hand side as well as from the right-hand side.

Owing to the extremely large size of the sieve drum, for example, with a diameter of 10 meters and more, it is of advantage if the suction draft is interrupted at that portion of the sieve drum not covered by the material by means of an adjustable internal baffle plate, just like in the known devices. This large baffle plate is heavy so that the adjustment thereof is connected with difficulty in case the standard design thereof is used with the present invention.

According to another object of the present invention, this difficulty is overcome in a simple way by providing the baffle plate, which is mounted so as to swivel or pivot on the sieve drum shaft, with a counter-weight so that the baffle plate can be accurately adjusted and fixed without a large amount of energy. Of course, it is also possible to mount the baffle and/or the baffle plate outside the sieve drum; in that case the baffle is preferably mounted on the housing of the device.

These and further objects, features, and advantages of the present invention will become more obvious from the following description when taken in connection with the accompanying drawing, which shows, for purposes of illustration only, several embodiment in accordance with the present invention, and wherein.

Figure 1:
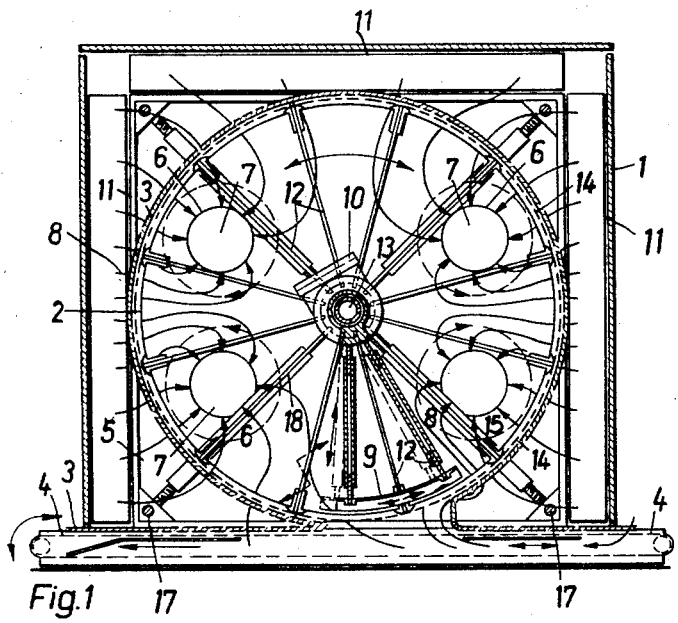
FIGURE 1 is a transverse cross-sectional view through the treatment chamber of a treatment device having one sieve drum in accordance with the present invention, the cross section being taken approximately in the plane of the device corresponding to plane 1—1 of FIGURE 4.

Referring now to the drawing, wherein like reference numerals are used throughout the various views to designate like parts, the device shown in FIGURE 1 consists of a housing 1 in which is pivotally supported a sieve drum 2. A material 3 to be treated is fed at one side of the housing 1 to the sieve drum 2 on a conveyor belt 4 and is discharged on the other side of the housing 1 by the same conveyor belt after having passed over the sieve drum. Since the sieve drum 2 may have a diameter of, for example, 10 meters approximately, several fans are arranged near the drum jacket according to the present invention. The fans are separated from the treatment chamber by a partition wall 5. Openings 6 are provided in the partition wall 5 the size of which openings corresponds to the size of the exhaust connections of fan wheels 7. In general, it is not necessary to distribute the fans evenly about the drum circumference; it is sufficient if those portions of the drum 2 on which the material is carried substantially vertically are provided with fan wheels 7. In the case of heavy-weight materials, it is possibly expedient to provide fan wheels 7 at the feeding and discharging points of the sieve drum. The air flow is indicated in FIGURE 1 by arrows 8.

The swiveling baffle plate 9 interrupts the suction draft along the portion of the drum to be free from material. In view of the size of the baffle plate 9, it is expedient to provide the baffle plate 9 with a counterweight 10 which essentially facilitates adjustment and re-adjustment of the baffle plate. Heating devices 11 are provided above and at the sides of the fan wheels 7. It is, of course, also possible to arrange the heating devices 11 within the sieve drum 2 or at the circumference of the sieve drum.

The sieve drum 2, properly speaking, consists of a drum jacket which is supported on a stationary shaft 13 by means of spokes 12 which are adjustable in length. The drum jacket may either consist of perforated sheets or of a wire mesh 14 which is held on ring 15, the diameter of which is adjustable. Such a construction of the sieve drum may especially be gathered from FIGURES 2 and 4.

Figure 2:
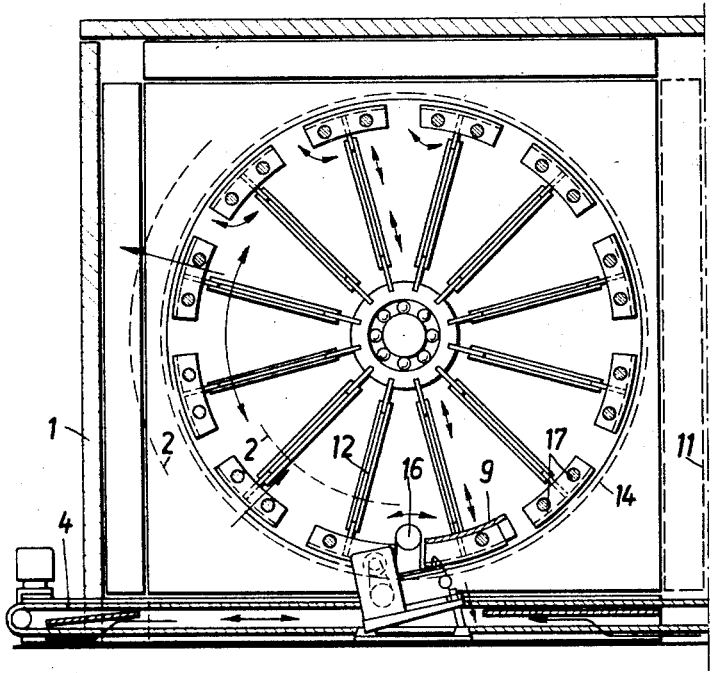
FIGURE 2 is a transverse cross-sectional view, similar to FIGURE 1, through another embodiment of a treatment device in accordance with the present invention, taken along line 2—2 of FIGURE 4.

The device shown in FIGURE 2 is of similar construction as the device shown in FIGURE 1. In FIGURE 2, only a friction gear 16 for driving the sieve drum as well as tie-rods 17 which connect the individual rings 15 of the sieve drum and which reinforce the sieve drum are shown in addition.

Figure 3:
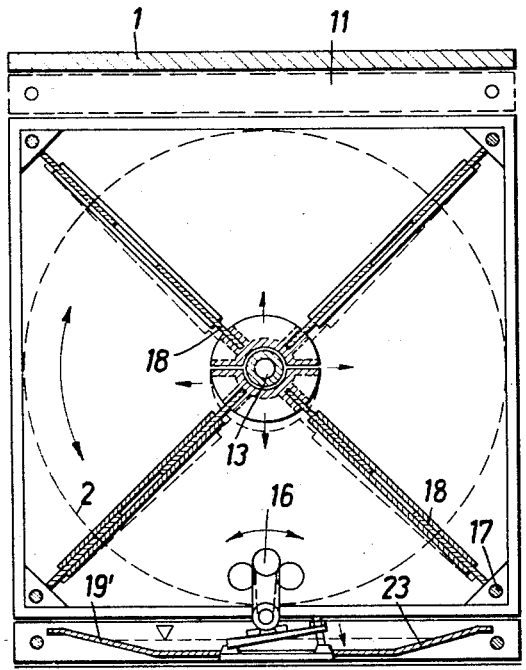
FIGURE 3 is a cross-sectional view through the sieve drum bearing of the device illustrated in FIGURES 2 and 4.

As may be gathered from FIGURE 3, the drum assembly is supported in the housing 1 on stays 18 which are adjustable in length. Since the stays 18 are adjustable, it is possible to easily re-adjust the drum bearing during assembly and other work and/or to adjust the drum in the desired position. If the device is not to be used as a dryer but as a steamer, a trough 19' filled with water can be provided below the drum through which trough steam is led which is enriched in the trough with so much moisture that saturated steam emerges from the trough 19'.

Figure 5:
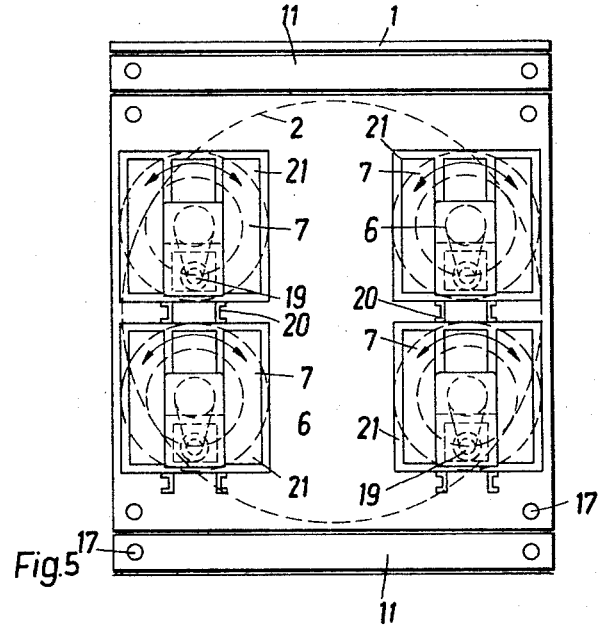
FIGURE 5 is an end elevational view of a treatment device according to the present invention, illustrating the fan arrangement thereof.
Figure 4:
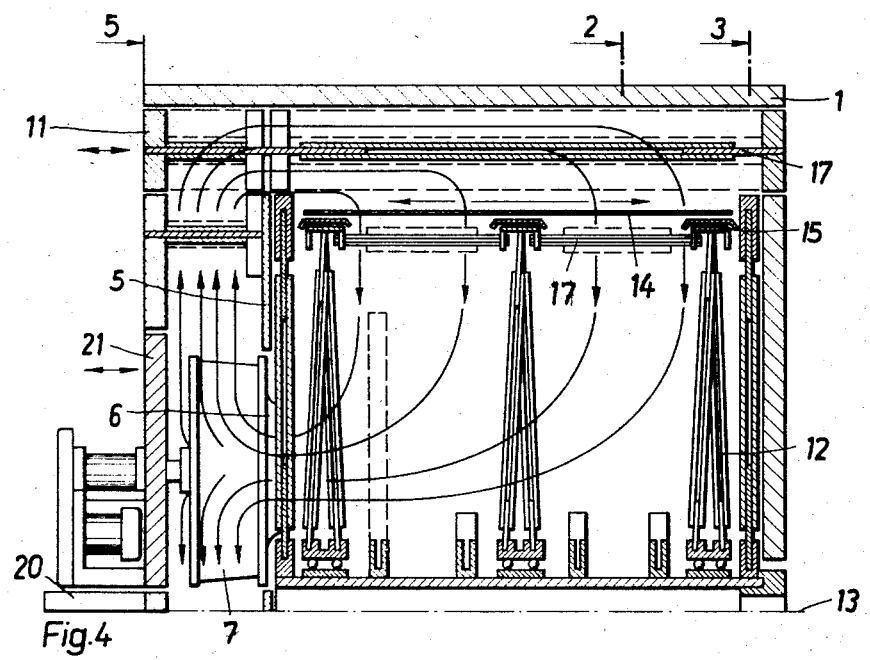
FIGURE 4 is an axial, longitudinal, cross-sectional view through the upper half of the device according to FIGURE 2, the lower half being of mirror-image-like construction.
Figure 4A:
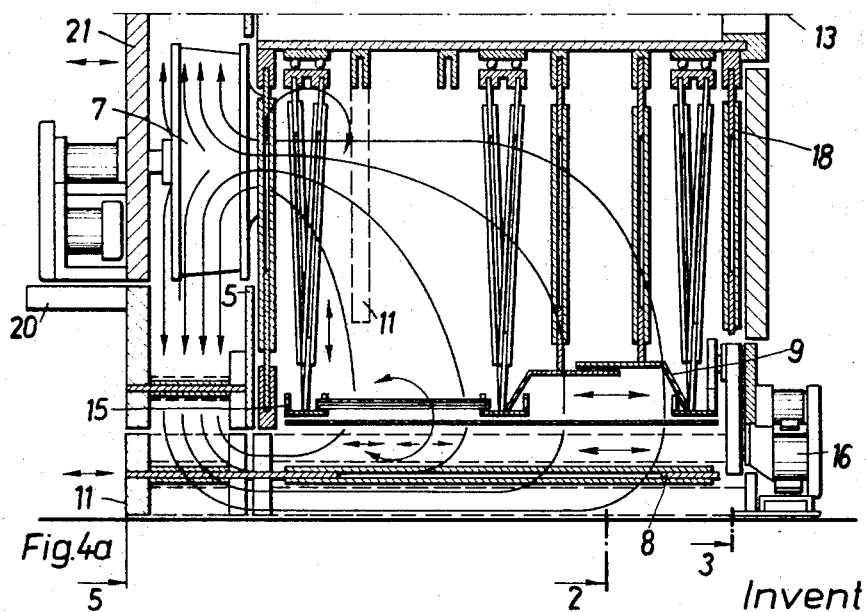
FIGURE 4a is an axial longitudinal cross-sectional view through the lower half of the device according to FIGURE 2, showing certain modifications, the other half being of mirror-image-like construction.

As may be gathered from FIGURES 4, 4a and 5, fan wheels 7 and fan drives 19 are mounted so as to be movable on rails 20. In order to enable driving or moving in and out of the fans, the housing 1 of the treatment device is provided with openings of corresponding size which can be closed by movable wall parts 21 appertaining to the fan drive unit and arranged behind the fans 7. FIGURES 4 and 4a show two sieve drum designs. The upper half of a device illustrated in FIGURE 4 shows a sieve drum with a wire mesh held by rings 15 whereas the lower half of a device illustrated in FIGURE 4a shows a sieve drum with a perforated sheet jacket. Rods 17 which connect the individual rings 15 and which reinforce the drum are not required in the design shown in the lower half of the figure. Possibly also the rings 15 may be disposed of and spokes 12 may be fastened to the perforated sheet jacket directly.

In the device according to FIGURE 1 as well as in the device according to FIGURE 5, the fan wheels are arranged at the side or the sides of the sieve drum. In the device according to FIGURE 5 the fan wheels are within the range of the sieve drum, i.e., they do not project beyond the sieve drum diameter. In that case openings 6 for sucking off the air are provided at a relatively large distance from the drum jacket. That design is particularly suited for wide sieve drums. For narrow sieve drums, it is more favorable to arrange the fan wheels in such a way that the exhaust connections and thus the openings 6 for sucking off the air are as close to the sieve drum jacket as possible. The fan wheels 7 project beyond the sieve drum diameter as shown in FIGURE 5. This design requires a slightly larger fan chamber in order to provide sufficient space for circulating the air discharged by the fan wheels.

While we have shown and described several embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are encompassed by the scope of the appended claims.

We claim:

1. A device for the treatment, especially for drying, cooling, or steaming of all kinds of material, particularly of fleece-forming materials such as non-wovens, which may not be reversed during the treatment process or which may only be supported on one side, comprising housing means forming a treatment chamber, at least one sieve drum means within said treatment chamber and constituting a conveying means, said sieve drum means comprising jacket means, means including several fans associated with each of said sieve drum means for producing within said sieve drum means a partial vacuum and to thereby transport said material on said sieve drum means through the treatment chamber, said sieve drum means being of relatively large diametric dimension, said fans being distributed, near the circumference of each sieve drum means, in the direction of travel of the material about the periphery of the sieve drum means, whereby the suctional draft of said fans is intensified in the peripheral region of said sieve drum means.

2. The device according to claim 1, wherein said sieve drum means has a diameter of more than three meters.

3. The device according to claim 2, wherein said fans are arranged at least at one side of the sieve drum means.

4. The device according to claim 2, further comprising common fan chamber means for accommodating therein said fans and arranged at least on one side of the sieve drum means, said fan chamber means being separated from the treatment chamber by a partition wall, exhaust connections for said fans, said wall being provided with openings substantially of the same size as said exhaust connections and said openings being correlated to said exhaust connections.

5. A device according to claim 4, further comprising drive means for said fans, rail means located outside of the housing means, each fan, together with its drive means, being movably supported on respective rail means thus defining a removable unit.

6. A device according to claim 5, in which the housing means is provided with openings to enable the fans to be moved in and out, movable wall parts for closing said last-mentioned openings, said movable wall parts being arranged behind the fans when the latter are within the housing means.

7. The device according to claim 6, further comprising heating means in the fan chamber means, said heating means being provided at least above and at the sides of the fans.

8. The device according to claim 5, further comprising adjustable baffle plate means arranged at that portion of the sieve drum means to be free from material, said sieve drum means including shaft means, and means including counter-weight means for pivotally mounting said baffle plate means on said shaft means.

9. The device according to claim 1, wherein said fans are arranged at least at one side of the sieve drum means.

10. The device according to claim 1, wherein said fans are distributed on the circumference of the sieve drum jacket means.

11. The device according to claim 1, further comprising common fan chamber means for accommodating therein said fans and arranged at least on one side of the sieve drum means, said fan chamber means being separated from the treatment chamber by a partition wall, exhaust connections for said fans, said wall being provided with openings substantially of the same size as said exhaust connections and said openings being correlated to said exhaust connections.

12. A device according to claim 11, further comprising drive means for said fans, rail means located outside of the housing means, each fan, together with its drive means, being movably supported on respective rail means thus defining a removable unit.

13. A device according to claim 12, in which the housing means is provided wtih openings to enable the fans to be moved in and out, movable wall parts for closing said last-mentioned openings, said movable wall parts being arranged behind the fans when the latter are within the housing means.

14. The device according to claim 11, further comprising heating means in the fan chamber means at least above and at the sides of the fans.

15. The device according to claim 1, further comprising bearing hub means for said sieve drum means, said sieve drum jacket means consisting of several perforated sheets, and adjustable spoke means connecting said perforated sheets with the bearing hub means.

16. The device according to claim 15, wherein said sieve drum means includes shaft means, and adjustable stay means for supporting said shaft means on said housing means.

17. The device according to claim 1, wherein said sieve drum means consists of wire mesh, ring means for said wire mesh, and spoke means for said ring means, said ring means being adjustable in diameter to hold the wire mesh under stress.

18. The device according to claim 17, further comprising cross bar means adjustable in length for connecting together said ring means.

19. The device according to claim 18, wherein said sieve drum means includes shaft means, and adjustable stay means for supporting said shaft means on said housing means.

20. The device according to claim 1, further comprising adjustable stay means for supporting said sieve drum means on said housing means.

21. The device according to claim 1, wherein said sieve drum means are centrally supported for rotation about their axes, and further comprising drive means for said sieve drum means including friction wheel means arranged at the drum jacket means.

22. The device according to claim 1, further comprising drive means for the sieve drum means including gear means engaging in a gear rim mounted on said drum jacket means.

23. The device according to claim 1, further comprising common conveyor belt means for feeding and discharging the material.

24. The device according to claim 23, further comprising means for so mounting said common conveyor belt means that it can be moved out of the housing means as a unit.

25. The device according to claim 23, further comprising means for reversing the direction of movement of the sieve drum means and of said conveyor belt means.

26. The device according to claim 1, wherein said fans are arranged at those portions of the sieve drum jacket means on which the material is transported essentially vertically.

27. The device according to claim 1, further comprising adjustable baffle plate means arranged along that portion of the sieve drum means to remain free from the material, said sieve drum means including shaft means, and means including counter-weight means for mounting said baffle plate means on said shaft means.

28. The device according to claim 1, whereby said several fans are positioned at a single lateral face of the sieve drum means.

References Cited

UNITED STATES PATENTS

| Re. 11,748 | 6/1899 | Proctor | 34—223 X |
| 217,102 | 7/1879 | Hatfield | 34—242 X |
| 1,377,793 | 5/1921 | Schwartz | 34—115 X |
| 1,504,183 | 8/1924 | Conger et al. | |
| 1,882,178 | 10/1932 | Cumberland | 210—402 |
| 1,974,231 | 9/1934 | Bighouse | 110—15 |
| 2,047,156 | 8/1936 | Renmann | 34—322 X |
| 2,879,607 | 3/1959 | Fleissner et al. | 34—122 X |
| 3,140,157 | 8/1964 | Fleissner et al. | 34—160 X |
| 3,315,370 | 4/1967 | Hikosaka | 34—116 X |

FOREIGN PATENTS 720,216   12/1931   France.

FREDERICK L. MATTESON, JR., *Primary Examiner.*

HARRY B. RAMEY, *Assistant Examiner.*

U.S. Cl. X.R.

73—336.5; 34—9.5, 89